(12) United States Patent
Vijayakumar et al.

(10) Patent No.: US 8,909,732 B2
(45) Date of Patent: Dec. 9, 2014

(54) SYSTEM AND METHOD OF ESTABLISHING TRANSMISSION CONTROL PROTOCOL CONNECTIONS

(75) Inventors: Rajiv K. Vijayakumar, San Diego, CA (US); Idreas Mir, San Diego, CA (US); Samson Jim, San Diego, CA (US); Mark Bapst, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 12/892,214

(22) Filed: Sep. 28, 2010

(65) Prior Publication Data

US 2012/0079060 A1    Mar. 29, 2012

(51) Int. Cl.
| G06F 15/16 | (2006.01) |
| H04L 29/06 | (2006.01) |
| H04L 29/08 | (2006.01) |

(52) U.S. Cl.
CPC ............... *H04L 69/16* (2013.01); *H04L 67/14* (2013.01); *H04L 67/02* (2013.01)
USPC ........................................................ 709/217

(58) Field of Classification Search
USPC .................. 709/217–219, 203, 223; 715/234
See application file for complete search history.

(56) References Cited

U.S. PATENT DOCUMENTS

| 6,751,777 | B2 * | 6/2004 | Bates et al. .................. 715/206 |
| 7,565,336 | B2 | 7/2009 | Pabari et al. |
| 7,730,187 | B2 | 6/2010 | Raciborski et al. |
| 7,941,841 | B2 * | 5/2011 | Kirchhoff ....................... 726/14 |
| 7,953,820 | B2 * | 5/2011 | Stevens et al. ................ 709/219 |
| 8,577,961 | B2 | 11/2013 | Rezaiifar |
| 2004/0049541 | A1 * | 3/2004 | Swahn .......................... 709/203 |
| 2005/0015434 | A1 * | 1/2005 | He ................................. 709/202 |
| 2005/0044242 | A1 * | 2/2005 | Stevens et al. ................ 709/228 |
| 2005/0074007 | A1 * | 4/2005 | Samuels et al. ............... 370/392 |
| 2005/0210122 | A1 | 9/2005 | Taylor et al. |
| 2006/0218245 | A1 * | 9/2006 | Horn ............................. 709/218 |
| 2007/0204223 | A1 * | 8/2007 | Bartels et al. ................. 715/540 |
| 2008/0208961 | A1 | 8/2008 | Kim et al. |
| 2008/0228938 | A1 | 9/2008 | Plamondon |

(Continued)

FOREIGN PATENT DOCUMENTS

| JP | 2007006214 A | 1/2007 |
| JP | 2008022157 A | 1/2008 |
| WO | WO2005094041 | 10/2005 |

OTHER PUBLICATIONS

Ben Leong and Barbara Liskov; "pDNS: Parallelizing DNS Lookups to Improve Performance," MIT Computer Science and Artificial Intelligence Laboratory. (2004).

(Continued)

*Primary Examiner* — Nicholas Jensen
*Assistant Examiner* — Berhanu Belete
(74) *Attorney, Agent, or Firm* — Nicholas A. Cole

(57) ABSTRACT

A method of establishing transmission control protocol (TCP) connections is disclosed and may include receiving a uniform resource locator (URL) as part of a hyper text transfer protocol (HTTP) request. Further, the method may include searching a host database with the URL and determining whether host data for the URL is available. The method may also include performing a domain name service (DNS) lookup for a URL host and for one or more sub-resource hosts, wherein all DNS lookups are performed in parallel at substantially the same time, when host data for the URL is available.

31 Claims, 12 Drawing Sheets

(56) References Cited

U.S. PATENT DOCUMENTS

| | | |
|---|---|---|
| 2009/0024698 A1* | 1/2009 | Ho et al. ............... 709/203 |
| 2010/0057843 A1* | 3/2010 | Landsman et al. ........... 709/203 |
| 2010/0082526 A1* | 4/2010 | Wassingbo .............. 707/603 |
| 2010/0268814 A1* | 10/2010 | Cross et al. ............. 709/224 |
| 2011/0093610 A1 | 4/2011 | Rezaiifar et al. |

OTHER PUBLICATIONS

Chang T Y, et al., "WebAccel: Accelerating Web access for low-bandwidth hosts", Computer Networks, Elsevier Science Publishers B.V., Amsterdam, NL, vol. 52, No. 11, Aug. 8, 2008, pp. 2129-2147, XP022734752, ISSN: 1389-1286, DOI:10.1016/J.C0MNET.2008.02.007 [retrieved on Mar. 18, 2008].

International Search Report and Written Opinion—PCT/US2011/045301, ISA/EPO—Oct. 21, 2011.

Shkapenyuk V et al: "Design and implementation of a high-performance distributed Web crawler", -Proceedings 18th. International Conference on Data Engineering. (ICDE'2002). San Jose, CA, Feb. 26-Mar. 1, 2002; [International Conference on Data Engineering. (ICDE)], Los Alamitos, CA : IEEE Comp. Soc, US, vol. Conf. 18, Feb. 26, 2002, pp. 357-368, XP010588251, DOI: 10.1109/ICDE.2002.994750 ISBN: 978-0-7695-1531-1.

Georgakis, et al., "User Behavior Modeling and Content Based Speculative Web Page Prefetching", Dec. 2006, Data & Knowledge Engineering, vol. 59 Issue 3, pp. 770-788.

Song H., et al., "Cache-miss-initiated Prefetch in Mobile Environments", Nov. 2004, Department of Computer Science and Engineering, The Pennsylvania State University, Computer Communications 28 (2005), pp. 741-753.

* cited by examiner

SYSTEM AND METHOD OF ESTABLISHING TRANSMISSION CONTROL PROTOCOL CONNECTIONS

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. Many of these portable computing devices include a web browser which may allow a user to access the Internet in order to download content, view content, etc. Typically, when a user inputs a uniform resource locator (URL) into a web browser, a DNS lookup is performed for the URL and a transmission control protocol (TCP) connection may be established. Thereafter, a main HTML file, or main resource, may be received from the host server for the URL. The main HTML file may point the web browser to one or more additional host servers in order to request and obtain one or more sub-resources. The process for performing DNS lookups for the additional host servers and establishing TCP connections may be substantially slow and may require a substantial amount of overhead.

Accordingly, what is needed is an improved system and method of establishing transmission control protocol connections.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
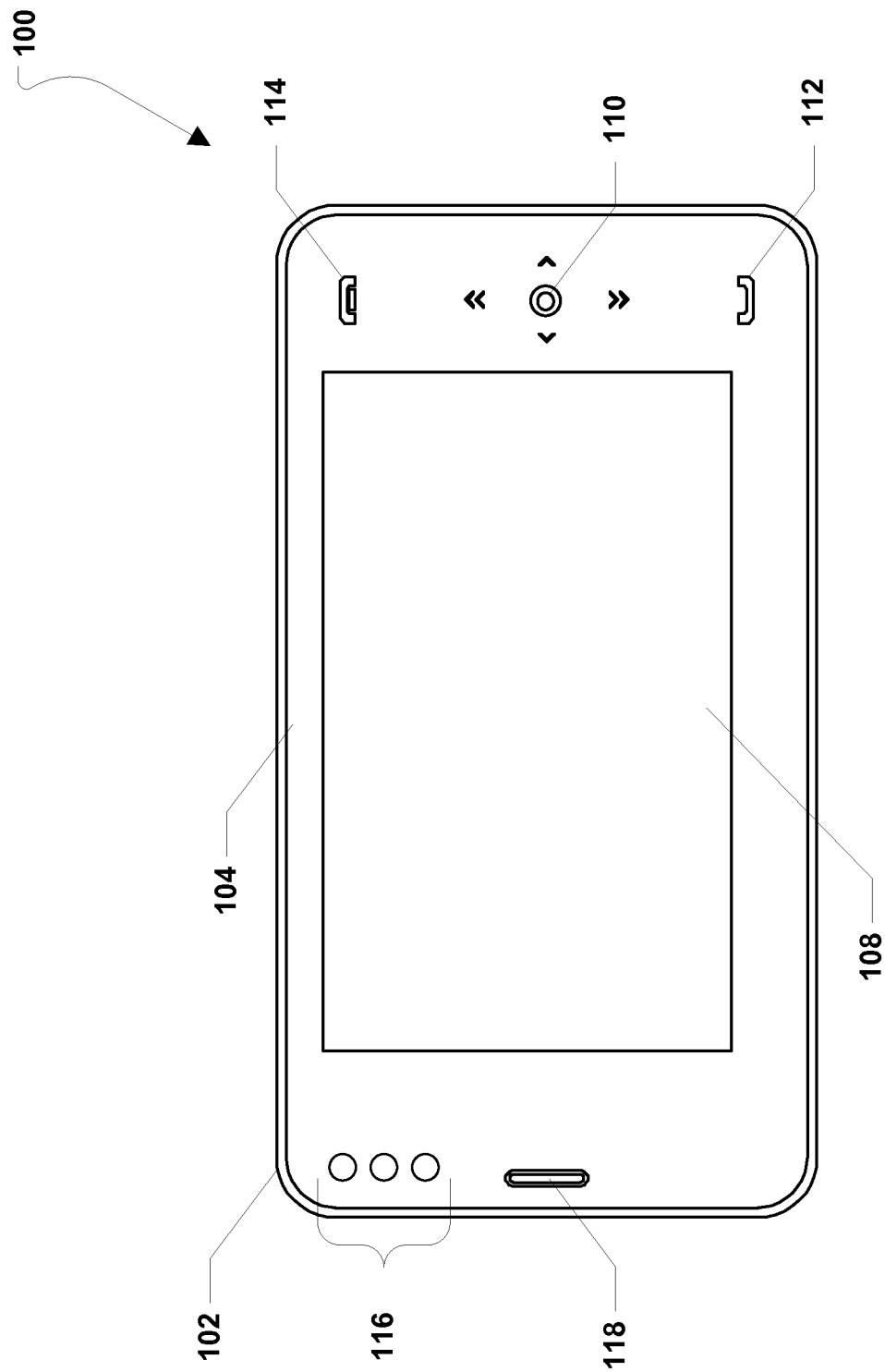
FIG. 1 is a front plan view of a first aspect of a portable computing device (PCD) in a closed position.
Figure 2:
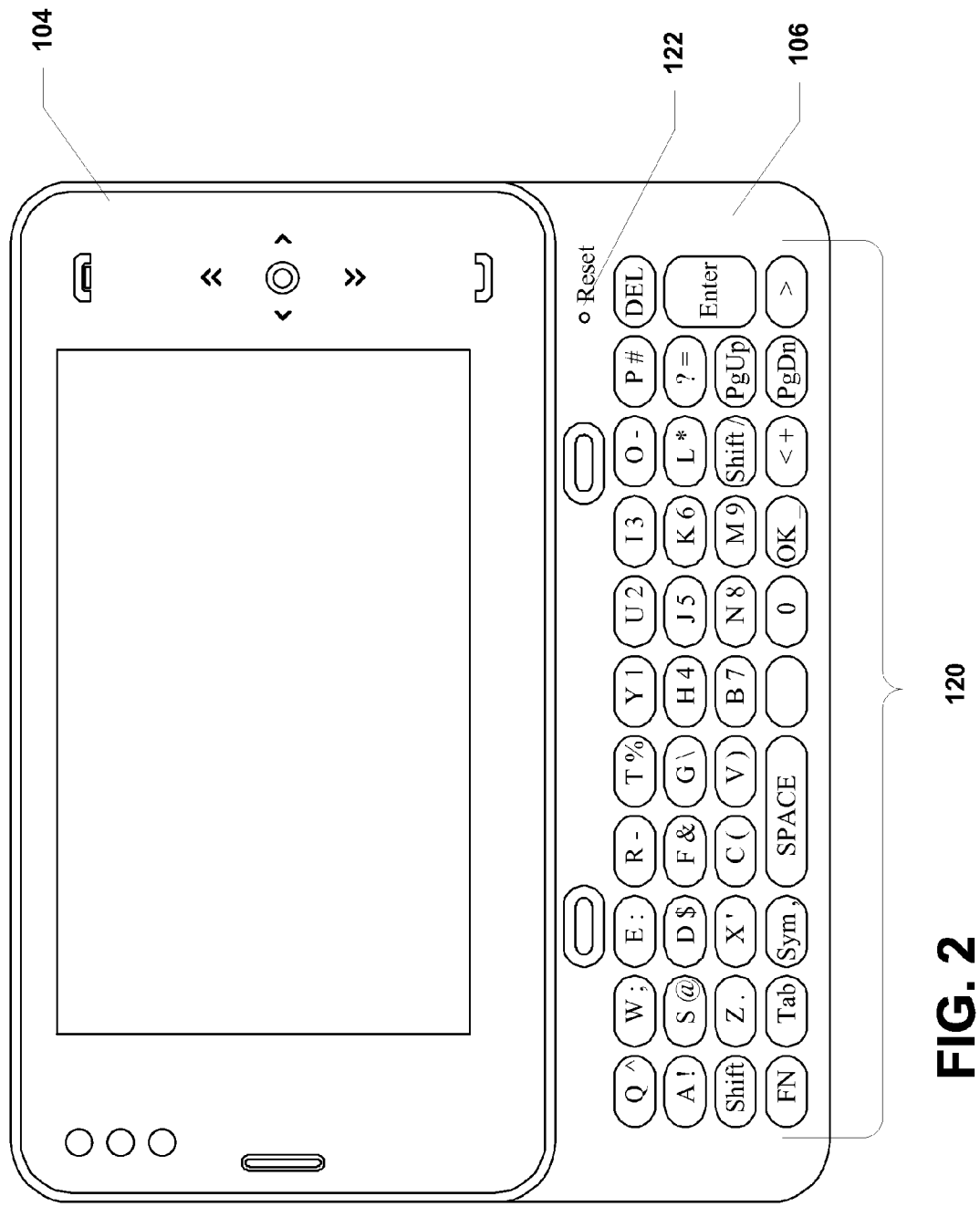
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
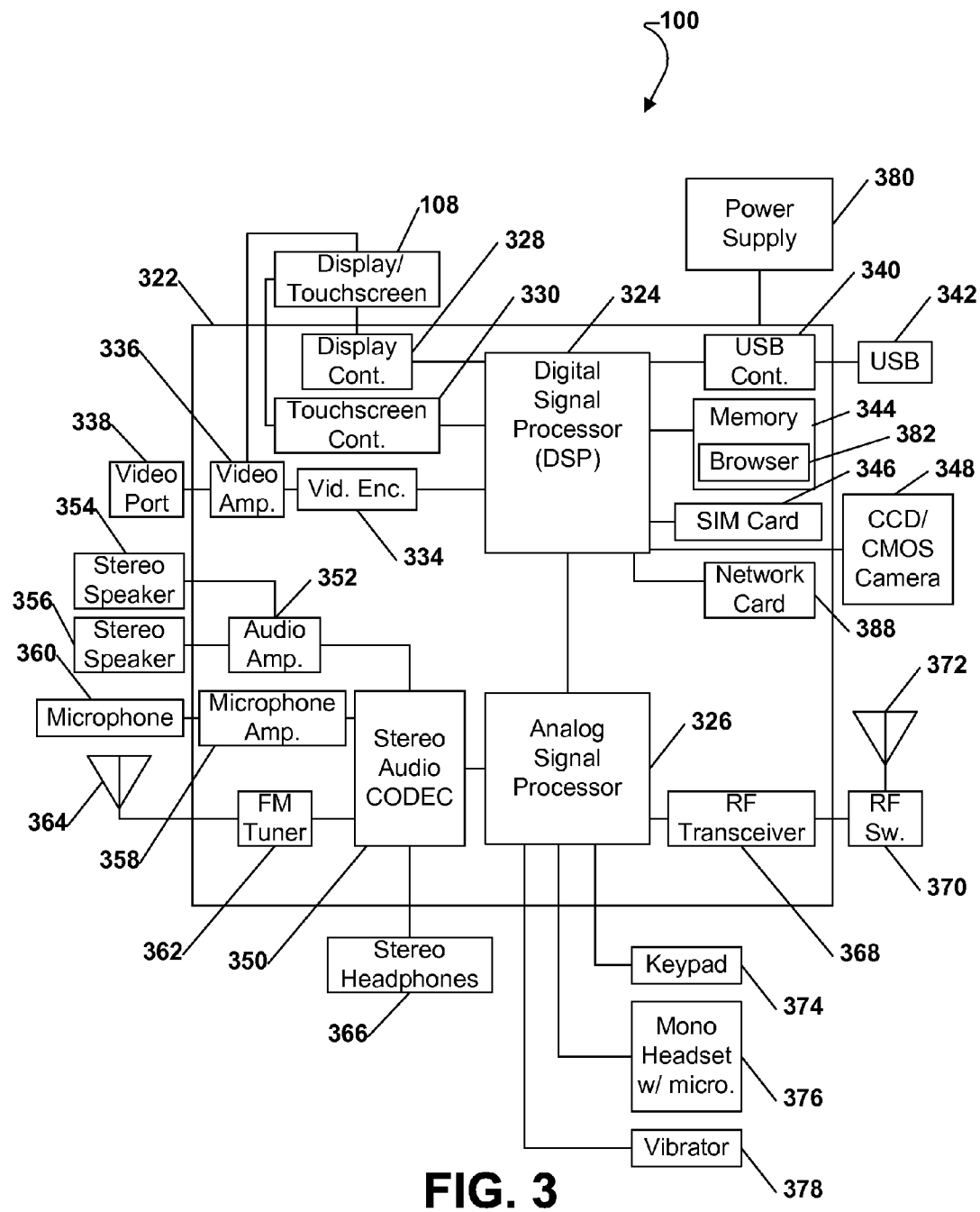
FIG. 3 is a block diagram of a second aspect of a PCD.

Referring to FIG. 3, an exemplary, non-limiting aspect of a portable computing device (PCD) is shown and is generally designated 100. As shown, the PCD 100 includes an on-chip system 322 that includes a digital signal processor 324 and an analog signal processor 326 that are coupled together. The on-chip system 322 may include more than two processors. For example, the on-chip system 322 may include multiple core processors and an ARM 11 processor, as understood by one of ordinary skill in the art.

As illustrated in FIG. 3, a display controller 328 and a touch screen controller 330 are coupled to the digital signal processor 324. In turn, a touch screen display 108 external to the on-chip system 322 is coupled to the display controller 328 and the touch screen controller 330.

FIG. 3 further illustrates a video encoder 334, e.g., a phase alternating line (PAL) encoder, a sequential couleur a memoire (SECAM) encoder, or a national television system(s) committee (NTSC) encoder, is coupled to the digital signal processor 324. Further, a video amplifier 336 is coupled to the video encoder 334 and the touch screen display 108. Also, a video port 338 is coupled to the video amplifier 336. As depicted in FIG. 3, a universal serial bus (USB) controller 340 is coupled to the digital signal processor 324. Also, a USB port 342 is coupled to the USB controller 340. A memory 344 and a subscriber identity module (SIM) card 346 may also be coupled to the digital signal processor 324. Further, as shown in FIG. 3, a digital camera 348 may be coupled to the digital signal processor 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the analog signal processor 326. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further illustrates that a radio frequency (RF) transceiver 368 may be coupled to the analog signal processor 326. An RF switch 370 may be coupled to the RF transceiver 368 and an RF antenna 372. As shown in FIG. 3, a keypad 374 may be coupled to the analog signal processor 326. Also, a mono headset with a microphone 376 may be coupled to the analog signal processor 326. Further, a vibrator device 378 may be coupled to the analog signal processor 326. FIG. 3 also shows that a power supply 380 may be coupled to the on-chip system 322. In a particular aspect, the power supply 380 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 3 further illustrates that the PCD 100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

FIG. 3 shows that the PCD 100 may also include a web browser 382 that may be stored within the memory 344. The web browser 382 may be used to search the Internet, access online content, download movies, download music, view movies, or a combination thereof.

As depicted in FIG. 3, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions, e.g., as part of the web browser 382. These instructions may be executed by a processor 324, 326 in order to perform the methods described herein. Further, the processors 324, 326, the memory 344, the web browser 382, or a combination thereof may serve as a means for executing one or more of the method steps described herein in order to establish one or more TCP connections.

Figure 4:
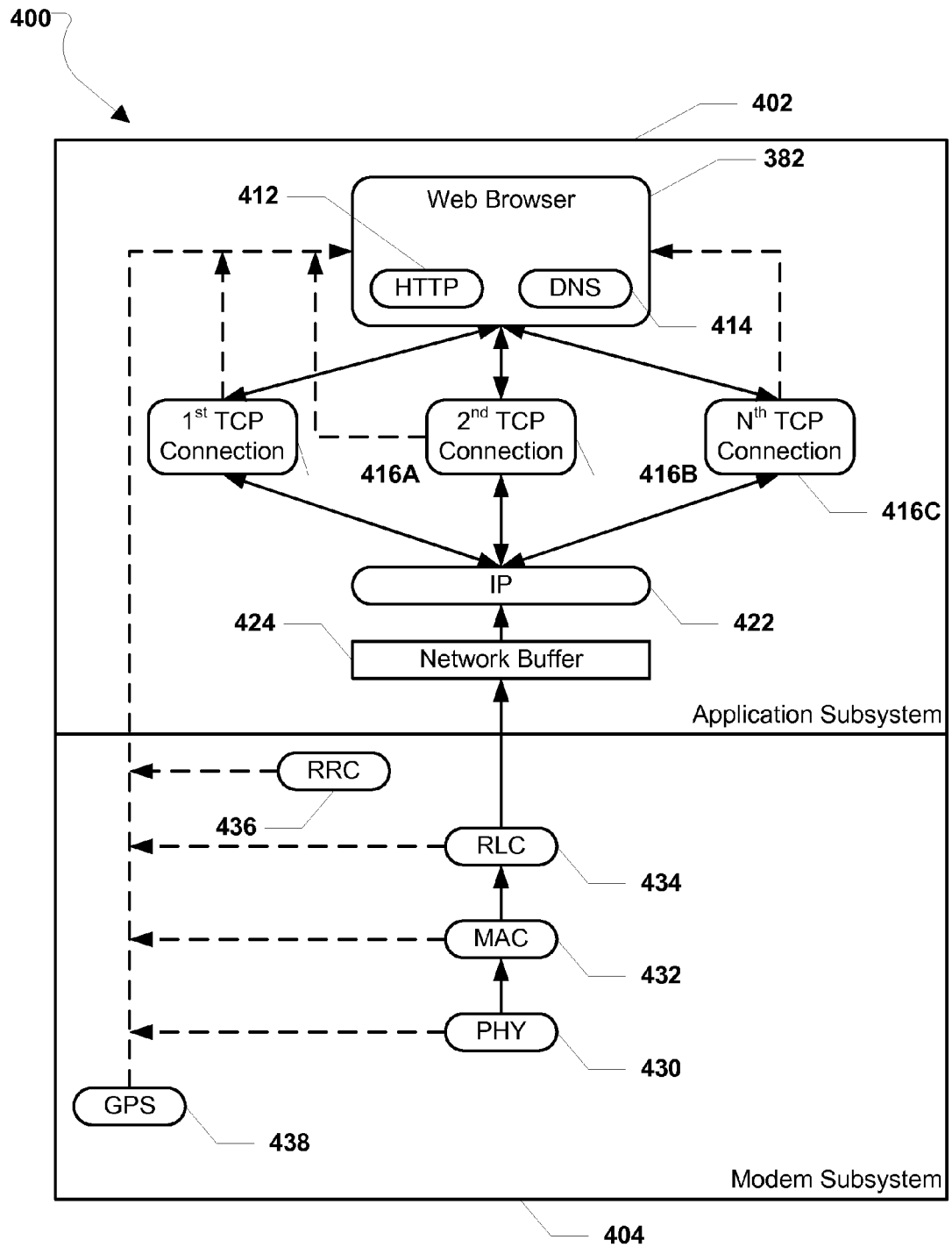
FIG. 4 is a diagram of a first aspect of a software architecture for a system that establishes TCP connections for a wireless portable computing device.

FIG. 4 is a diagram of a first aspect of a software architecture of an application subsystem 402 that establishes TCP connections for a wireless portable computing device 100. The application subsystem 402 may comprise a mobile web browser 382 that is executed by a digital signal processor or central processing unit 324 (see FIG. 3) and which may support webpages that require one or more TCP connections.

The mobile web browser application or module 382 may communicate with transfer communication protocol ("TCP") modules 416A-C that reside over an Internet protocol ("IP") layer 422 as understood to one of ordinary skill in the art and described below.

The IP layer 422 communicates with a network buffer layer 424 as understood by one of ordinary skill the art. The IP layer 422 communicates with a modem subsystem 404, which is executed by a second central processing unit or an analog signal processor 326 (see FIG. 3).

The mobile web browser module 382 an HTTP stack 412 and a domain name server module 414. The web browser module 382 may be dynamic in that it may continually monitor elements of the application subsystem 402 as well as the modem subsystem 404.

The DNS module 414 of the web browser 382 may be responsible for translating the text based domain names into the numeric Internet protocol (IP) address as understood by one of ordinary skill the art. The DNS module 414 may communicate the IP address back to the HTTP stack 412 which in turn relays it to one of the TCP connection modules 416A-C.

When the HTTP stack 412 returns a meta-object, such as a web page, from one of the TCP connection modules 416A-C, the HTTP stack module 412 may also provide the client web browser module 382 with certain status information. The status information may include, but is not limited to: high speed-schedule control channel ("HS-SCCH") Valid status; high speed transport block size ("HS-TBS"); layer one block error rates ("L1 BLER"); radio link control protocol data unit ("RLC PDU") size; radio link control down link service data unit ("RLC DL SDU") Byte received ("Rx"); high speed downlink packet access ("HSDPA") user equipment ("UE") Category; media access control uplink buffer status report ("MAC UL BSR"); enhanced uplink transmission time interval ("EUL TTI"); enhanced transport format combination index ("ETFCI") table index; ETCFI; the number of new transmissions ("Tx"); radio link control uplink service data unit ("RLC UL SDU") Byte transmission ("Tx"); diversity transmission/diversity reception ("DTX/DRX") mode; enhanced uplink user equipment ("EUL UE") category; media access control transmission layer transport block size ("MAC TL TBS"); packet data convergence protocol downlink service data unit ("PDCP DL SDU") Byte reception ("Rx"); media access control uplink transport block size ("MAC UL TBS"); packet data convergence protocol uplink service data unit ("PDCP UL SDU") Byte transmission ("Tx"); and user equipment category ("UE Category").

The Transport Control Protocol ("TCP") connection modules 416A-C operate in the Transport Layer of the Open Systems Interconnection ("OSI") model of general networking as understood by one of ordinary skill in the art. The TCP connection module 416 is responsible for encapsulating application data blocks into data units (datagrams, segments) suitable for transfer to the network infrastructure for transmission to the destination host, or managing the reverse transaction by abstracting network datagrams and delivering their payload to the mobile web browser 382.

The TCP connection modules 416 may provide information that includes, but is not limited to, re-transmission time out ("RTO"); advertised receiver window ("Rx Window"); transmission-receiver throughput ("Tx/Rx Throughput"); packet statistics; a total number of TCP connections; estimated round-trip time ("RTT"); number of bytes received; the number of in sequence packets; and the TCP transmitting window size.

The Internet Protocol ("IP") module 422 communicates with the TCP connection modules 416 and the network buffer layer 424. The IP module 422 has the task of delivering distinguished protocol datagrams (packets) from the mobile web browser to the server based on their addresses. The IP module 422 defines addressing methods and structures for datagram encapsulation. The IP module 422 may utilize Internet Protocol Version 4 ("IPv4") as well as Internet Protocol Version 6 ("IPv6"), which is being deployed actively as of this writing. However, other versions of the Internet protocol, including future ones not yet developed, are included within the scope of the invention.

The network buffer layer 424 communicates with the IP module 422 and the modem subsystem 404. The network buffer layer 424 may contain all hardware specific interface methods, such as Ethernet and other IEEE 802 encapsulation schemes. The network buffer layer 424 may probe the topology of a local network. It may discover routers and neighboring hosts, and it may be responsible for discovery of other nodes on the link. The network buffer layer 424 may determine the link layer addresses of other nodes, find available routers, and maintaining reachability information about the paths to other active neighbor nodes.

The web browser module 382 may communicate with the http stack 412 as well as the TCP modules 416. The web browser module 382 may also communicate with one or more sensors, such as a satellite navigations system module such as a Global Positioning System (GPS) module 438.

The modem subsystem 404 may comprise a radio link control ("RLC") layer 434, a media access control ("MAC") layer 432, a physical ("PHY") layer 430, a radio-relay control ("RRC") module 456, and a satellite navigation system such as the global positioning system ("GPS") 143. These elements of the modem subsystem 404 may be responsible for communicating with communications hardware such as the RF transceiver 368 as illustrated in FIG. 3.

Each of the elements of the modem subsystem 404 may send messages or receive queries from the web browser module 382. For example, the RRC module 436 may communicate information such as, but not limited to, high speed downlink packet access ("HSDPA") category information, enhanced uplink layer ("EUL") category information, and discontinuous reception/transmission ("DRX/DTX") configuration ("Config") information.

The RLC module 434 may communicate throughput as well as radio link control ("RCL") protocol data unit ("PDU") size. The MAC layer 432 may communicate uplink ("UL") information, such as, but not limited to, buffer status report ("BSR") information and enhanced dedicated channel ("EDCH") transport format ("TF") information. The physical layer 430 may communicate the downlink ("DL") information, such as, but not limited to, high speed transport block size ("HS-TBS"), modulation, channel quality indication ("CQI"), block error rate ("BLER") measurement, multi-input/multi-output ("MIMO"), receiver ("Rx") automatic gain control ("AGC"), as well as equalizer integrated circuit ("EQ/IC") receiver ("Rx") diversity ("D"). The physical layer 430 may also communicate uplink ("UL") information, such as, but not limited to, BLER, modulation, and transmitter ("Tx") automatic gain control ("AGC").

The RRC module 436, RLC module 434, MAC module 432, and PHY module 430, may form an evolved high-speed packet access system ("HSPA") 816 (see FIG. 8 below) as is understood to one of ordinary skill the art. Meanwhile, the GPS module 438 may provide information, such as, but not limited to, location, and speed or velocity of the portable computing device 100 to the web browser module 382.

By monitoring elements of the application subsystem 402 and the modem subsystem 404, the web browser module 382 may allow the wireless portable computing device 100 to intelligently select web pages that will likely be viewed by the operator of the PCD 100 by monitoring wireless network conditions as well as conditions of the portable computing device 100 itself. The web browser module 382 may determine the size and type of web pages that it should load by using the monitored conditions to determine what is the appropriate bit rate for a web page to be downloaded from a server.

Some of the monitored conditions based upon the data provided by the application subsystem 402 and the modem subsystem 404 include, but are not limited to: memory conditions, including the size of the current buffer and the rate at which the buffer's growing are being consumed by the portable computing device 100; current and historical WWAN bandwidth; current and historical WWAN signal strength; number of IP socket data connections available; estimation of an overall video clip length and then estimating each uniform resource locator ("URL") download time for each file segment for a web page based on signal-noise-ratio history/histogram and location based service ("LBS"); rate of speed of the portable computing device 100 which is calculated by either cell tower identification triangulation or precise latitude longitude through the use of location-based technologies such as the GPS module 143; and the direction of travel of the portable computing device 100 using an accelerometer and/or the LBS.

The web browser module 382 may calculate a predetermined time period that must be maintained or use a lower bit rate until the signal-to-noise ratio stays high and/or the BLER stays low continuously. The web browser module 382 may also turn "on" or turn "off" any type of receive diversity function(s) in the modem subsystem 404 in order to minimize power during ideal network situations, such as when the portable computing device 100 is stationary, or when the portable computing device 100 is operating under relatively low-speed conditions, such as when a user is walking with the portable computing device 100.

During operation, the TCP connection modules 416A-C may provide connection information to the web browser 382 and the web browser 382 may use the connection information in order to facilitate the efficient establishment of other TCP connections, the use of existing TCP connections, or a combination thereof. The connection information may include a TCP retransmission timeout (RTO) estimate, a TCP receive window size, a last out of order packet, or a combination thereof.

The PHY module 430, the MAC module 432, the RLC module 434, the RRC module 436, the GPS 438, or a combination thereof may provide modem subsystem information to the web browser 382. The web browser 382 may also use the modem subsystem 4040 information in order to facilitate the efficient establishment of other TCP connections, the use of existing TCP connections, or a combination thereof. The modem subsystem information may include a GPS vertical speed, a GPS horizontal speed, a maximum achievable throughput (TP) for the HSPA downlink (DL), a current TP for the HSPA DL, or a combination thereof.

It may be appreciated that the web browser 382 may use the connection information, the modem subsystem information, or a combination thereof, as described herein, in order to establish new TCP connections or re-use existing TCP connections.

In a typical portable computing device, e.g., a mobile telephone, a web browser 382 may load a main resource, i.e., a main HTML file, from a primary host server. A main resource usually comprises a first resource that an internet web browser downloads when a user clicks on a link or enters a universal resource locator (URL). For web pages, this is usually a hypertext mark-up language (HTML) file. If a user clicks on a link to an image, then it may be an image file, but usually the main or primary resource for a web page is always an HTML file. HTML files are usually the only type of resources that may have sub-resources. Also, the term "HTML" is understood by one of ordinary skill in the art to include XHTML or HTML5.

Meanwhile, a sub-resource usually is an additional file that is referenced or specified within a main resource. A sub-resource usually is needed to completely and correctly display a web page. Sub-resources may be of various types of files that include, but are not limited to, other second HTML files (files relative to a main or first HTML file (main resource) that are referenced by the first HTML file), CSS files, JavaScript files, Flash files and image files.

The primary host may direct the web browser to one or more secondary host servers each having a different domain name. For each different domain name, a DNS lookup is performed prior to establishing a TCP connection. Increased DNS lookups, performed in series, may substantially slow down the establishment of TCP connections and the retrieval of resources and sub-resources by a web browser. The method and system disclosed herein may substantially speed up DNS lookups and the establishment of TCP connections.

Figure 5:
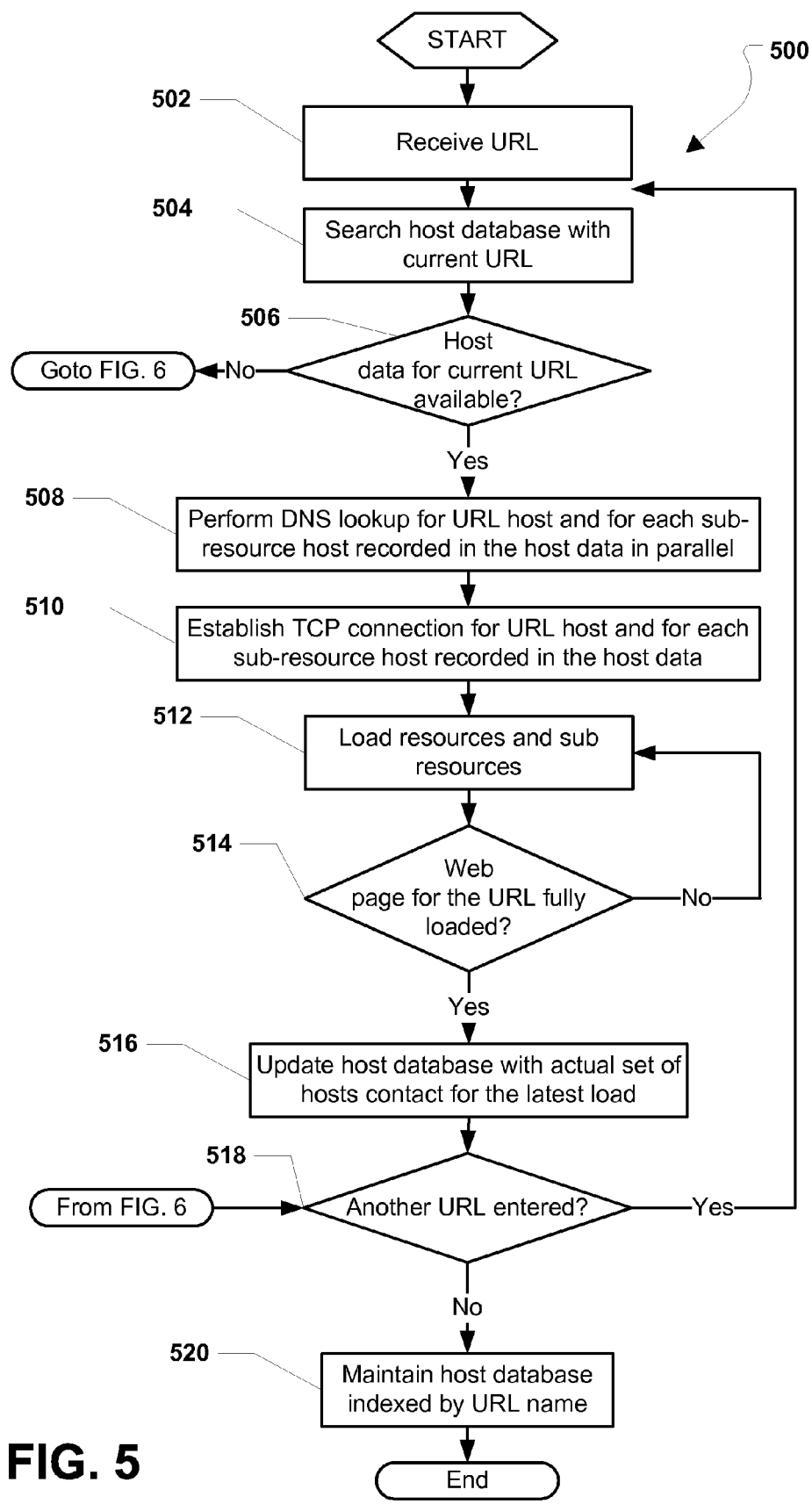
FIG. 5 is a first portion of a flowchart illustrating a first aspect of a method of establishing TCP connections.
Figure 6:
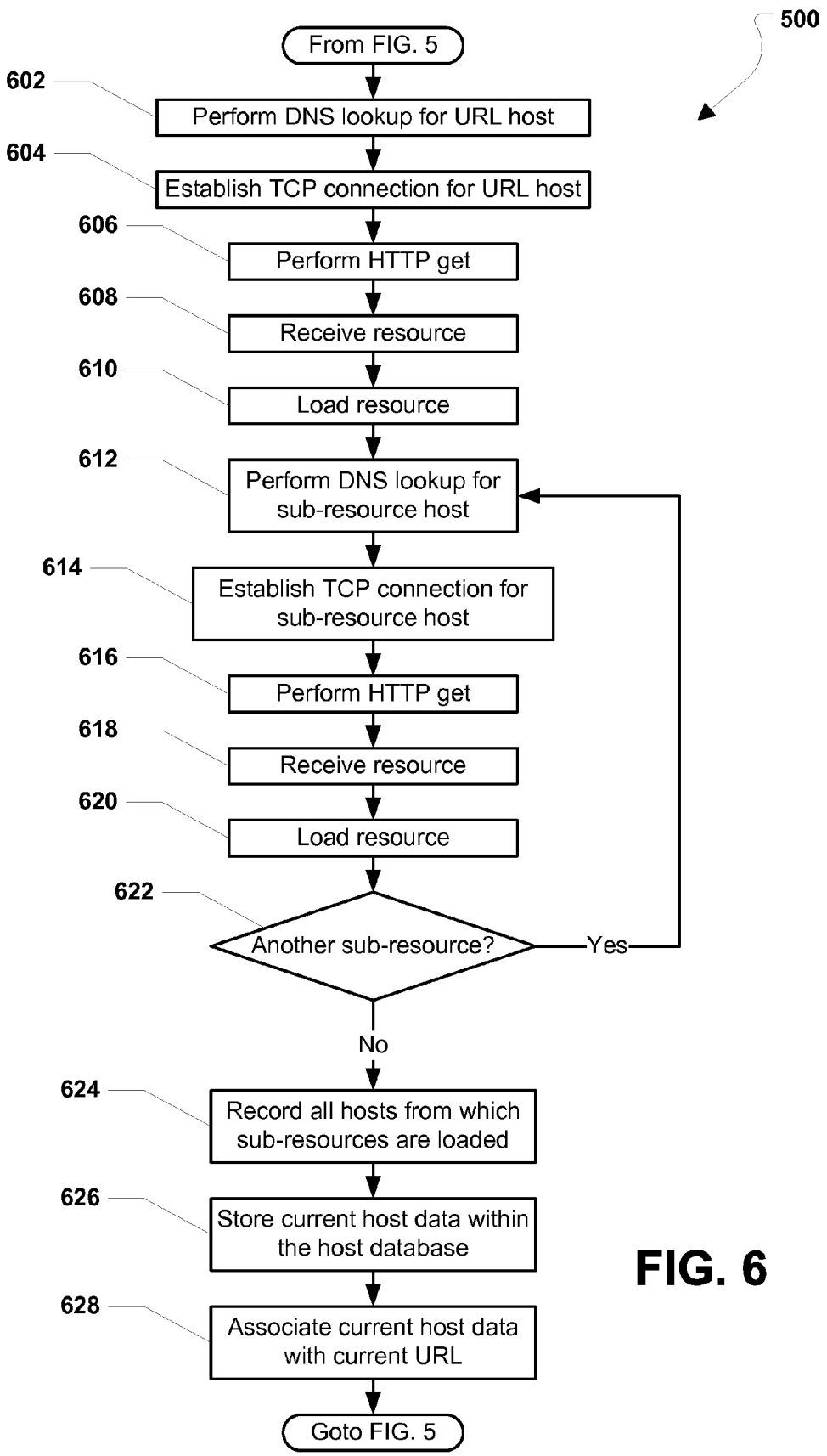
FIG. 6 is a second portion of the flowchart illustrating a first aspect of a method of establishing TCP connections.

Referring to FIG. 5 and FIG. 6, a first aspect of a method of establishing TCP connections is shown and is generally designated 500. The method 500 may begin at block 502 with a do loop in which when a uniform resource locator (URL) is entered into a web browser, the following steps are performed. The URL may be part of a hyper text transfer protocol (HTTP) request. At block 504, the web browser 382 may search a host database 403 maintained within the memory resource 334 with the current URL. The host database 403 may comprise a lists of hosts, such as servers, indexed by their URLs. These lists of hosts are the servers which contain the resources and sub-resources that were loaded for a particular URL the last time that the content associated with the URL was loaded on the device. When the user of PCD 100 navigates to a particular URL, the database 403 may be consulted, and if an entry is found, then a DNS lookup and TCP connection is performed for each host listed in the database entry (before the issuance of any GET commands) and in parallel with the main resource load.

Moving to decision block 506, the web browser 382 may determine whether host data is available for the current URL. If host data is not available for the current URL, the method 500 may proceed to block 602 of FIG. 6. Host data may not be available, for example, when a particular URL is accessed for a first time.

Returning to decision block 506, if host data is available for the current URL, the method 500 will proceed to block 508 and the web browser 382 may perform a DNS lookup for the URL host and for each sub-resource host recorded in the host data. The various lookups may be performed substantially in parallel, i.e., substantially at the same time. Moving to block 510, the web browser 382 may establish a TCP connection for the URL host and for each sub-resource host recorded in the host data using one of the TCP modules 416 of FIG. 4. The TCP connections may be established in substantially parallel, i.e., the TCP connections may be established at substantially the same time. At block 512, the web browser 382 may load all resources from the URL host and all sub resources from all sub resource hosts into the memory resource 344.

Proceeding to decision block 514, the web browser 382 may determine whether the web page associated with the URL is fully loaded. If not, the method 500 may return to block 512 and continue as described herein. Otherwise, if the web page associated with the URL is fully loaded, the method 500 may proceed to block 516 and the web browser 382 may update the host database 403 with the actual set of hosts which were contacted for the latest page load associated with the current URL.

At decision block 518, the web browser 382 may determine whether another URL is entered. If so, the method 500 may return to block 504 and the method 500 may continue as described herein. Conversely, if another URL is not entered, the method 500 may continue to block 520 and the web browser 382 may maintain the host database 403. In a particular aspect, the host database 403 may be indexed by URL name. Thereafter, the method 500 may end.

Returning to decision block 506, if host data is not available for the current URL, the method 500 may move to block 602 of FIG. 6. At block 602, the web browser 382 may perform a DNS lookup for the URL host. At block 604, the web browser 382 may establish a TCP connection for the URL host using one of the TCP modules 416 of FIG. 4. Further, at block 606, the web browser 382 may perform an HTTP GET command for the URL host. At block 608, the web browser 382 may receive a resource from the URL host. At block 610, the web browser 382 may load the resource from the URL host into the memory resource 344.

Moving to block 612, the web browser 382 may perform a DNS lookup for the sub-resource host. Then, at block 614, the web browser 382 may establish a TCP connection for a sub-resource host. At block 616, the web browser 382 may perform an HTTP GET command for the sub-resource host. At block 618, the web browser 382 may receive a sub-resource from the sub-resource host. Also, at block 620, the web browser 382 may load the sub-resource received from the sub-resource host.

Continuing to decision block 622, the web browser 382 may determine whether another sub-resource exists for the current URL. If so, the method 500 may return to block 612 and the method 500 may continue as described. At decision block 622, if there is not another sub-resource for the current URL, the method 500 may proceed to block 624 and the web browser 382 may record all sub-resource hosts from which the sub-resources for the current URL are loaded. Thereafter, at block 626, the web browser 382 may store the current host data within the host database. At block 628, the web browser 382 may associate the current sub-resource host data with the current URL. Then, the method 500 may return to decision block 518 of FIG. 5 and the method 500 may continue from decision block 518 as described herein.

Figure 7:
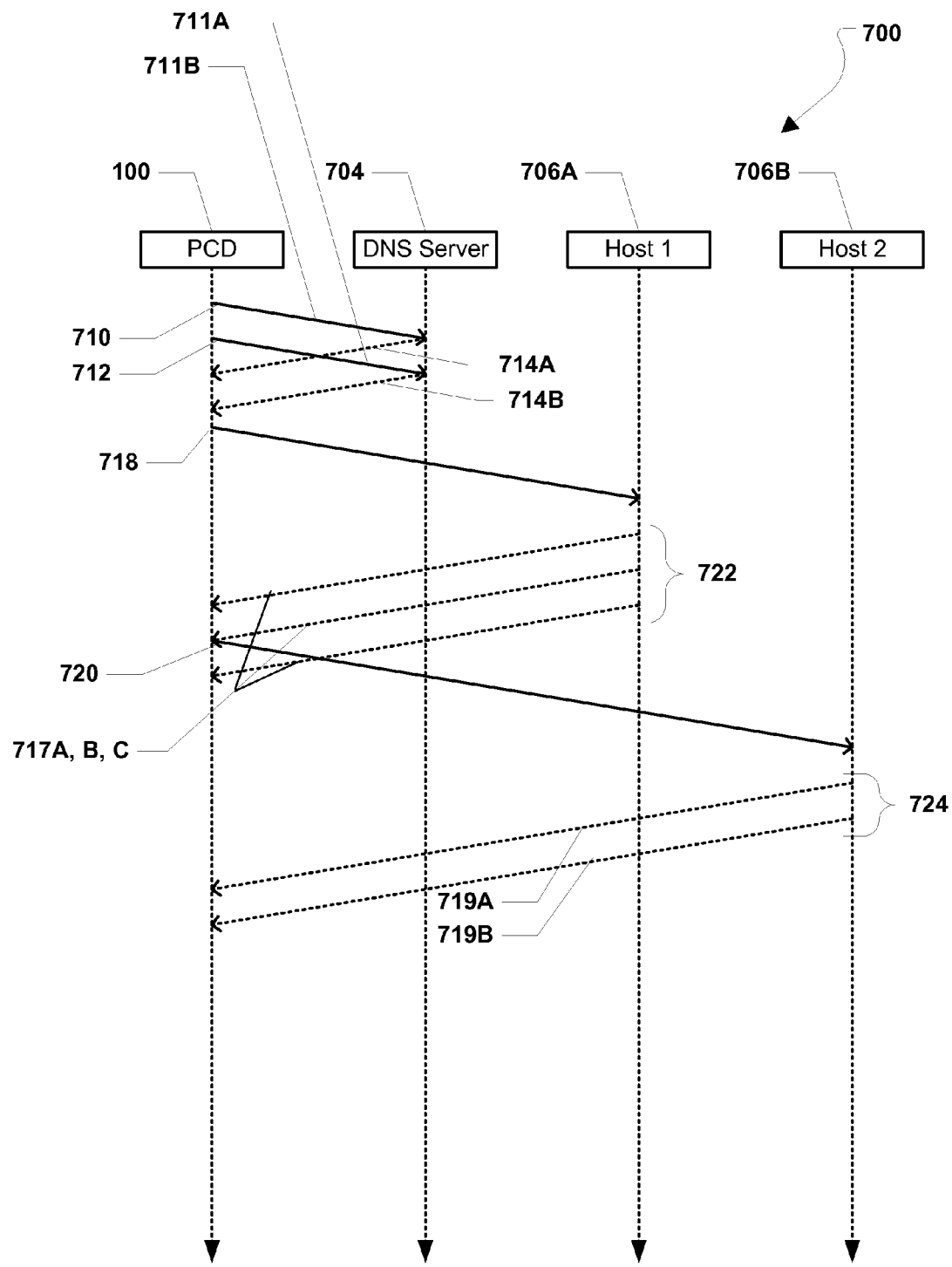
FIG. 7 is a flowchart illustrating a second aspect of a method of establishing TCP connections.

Referring now to FIG. 7, a second aspect of a method of establishing TCP connections is shown and is generally designated 700. For clarity, the method 700 is described in the context of a PCD 100, a DNS server 704, a first host server 706A, and a second host server 706B.

Beginning at steps 710 and 712, the PCD 100 may transmit a first query and a second query to the DNS server 704. The first query 711A and the second query 711B may be transmitted in parallel, i.e., at substantially the same time. At steps 714A and 714B, the PCD 100 may receive a first response and a second response from the DNS server 704. The first response 714A may direct the PCD 100 to the first host 706A and the second response 714B may direct the PCD 100 to the second host 706B. The first host 706A may provide one or more primary resources to be loaded at the PCD 100, e.g., at a web browser 382, and the second host 706B may provide one or more sub-resources.

At step 718, the PCD 100 may transmit a first HTTP GET command 715A to the first host 706. Further, at step 720, the PCD 100 may transmit a second HTTP GET command 715B to the second host 708. The HTTP GET commands 715A, 715B may be transmitted in parallel, i.e., at substantially the same time. At step 722, the PCD 100 may receive one or more main resources 717A-C from the first host 706A. Moreover, at step 724, the PCD 100 may receive one or more sub-resources 719A, 719B from the second host 708.

In a particular aspect, the web browser 382 at the PCD 100 may load the main resource, i.e., the main HTML file, and then, the web browser 382 at the PCD 100 may load the sub-resources. Once loaded, the main resource and the sub-resources may establish a web page for viewing via the display of the PCD 100.

Figure 8:
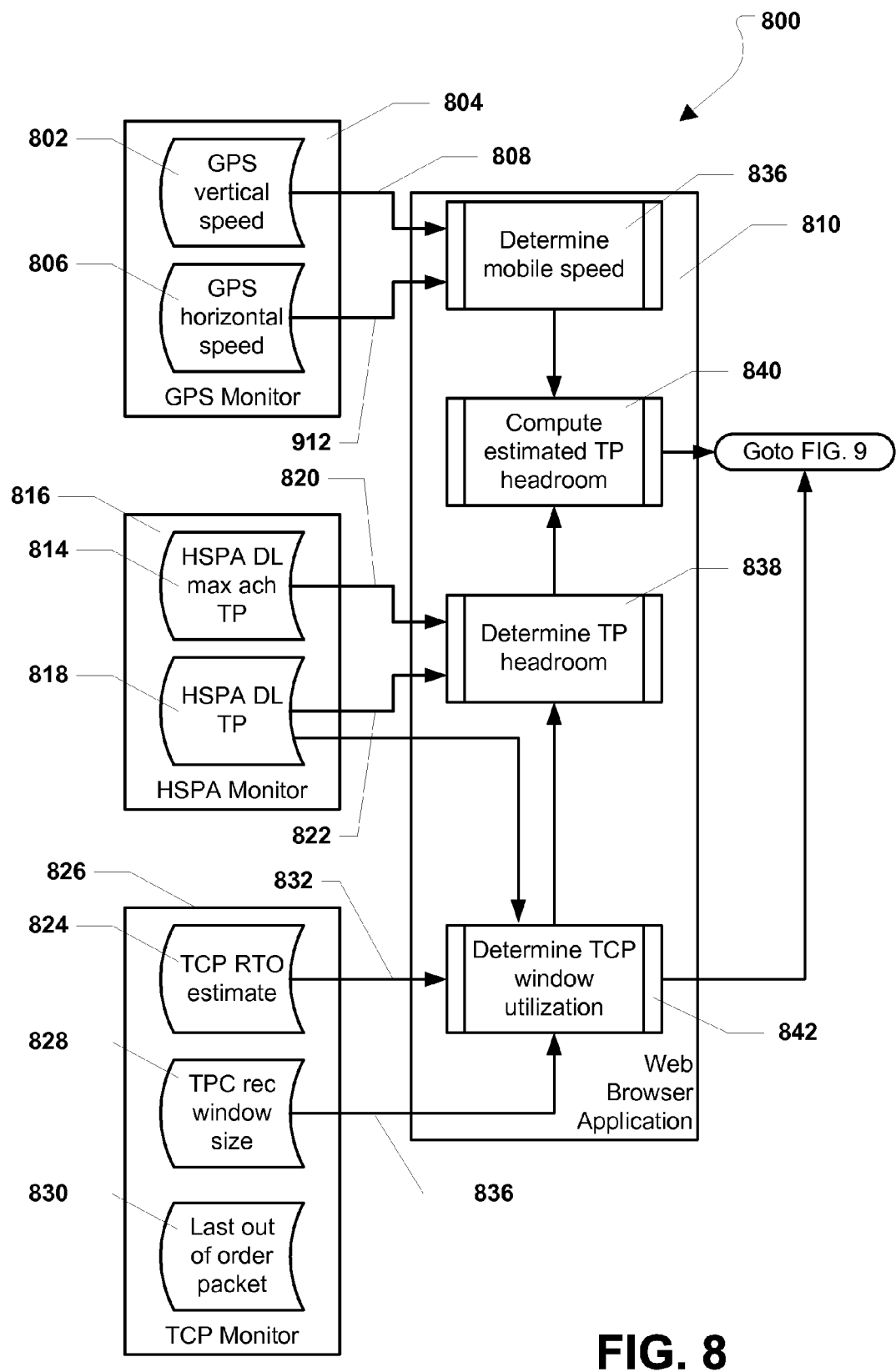
FIG. 8 is a first portion of a flowchart illustrating a second aspect of a method of establishing TCP connections.
Figure 9:
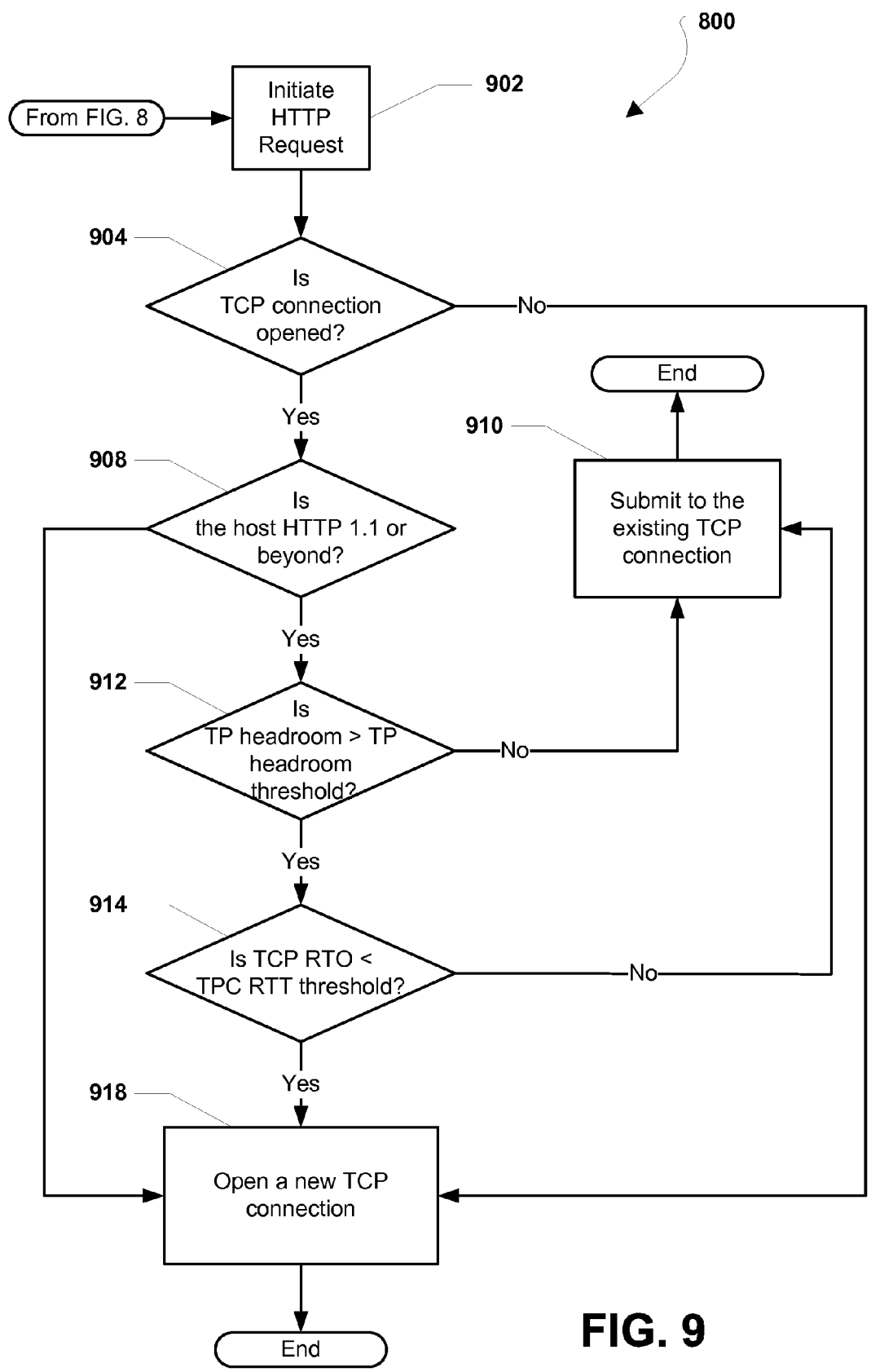
FIG. 9 is a second portion of the flowchart illustrating a third aspect of a method of establishing TCP connections.

Referring now to FIG. 8 and FIG. 9, a third aspect of a method of establishing one or more transmission control protocol (TCP) connections is shown and is generally designated 800. Beginning at step 802, a GPS monitor 804 may monitor, or otherwise determine, a GPS vertical speed associated with a portable computing device (PCD). At step 806, the GPS monitor 804 may determine a GPS horizontal speed associated with the PCD. Thereafter, at step 808, the GPS monitor 804 may output the GPS vertical speed to a web browser 382. Further, at step 812, the GPS monitor 802 may output the GPS horizontal speed to the web browser 382.

Moving to step 814, a high speed packet access (HSPA) system 816 (described above) may determine a maximum achievable throughput (TP) for the HSPA downlink (DL). Further, at step 818, the HSPA system 816 may determine the current TP for the HSPA DL. At step 820, the HSPA system 816 may output the maximum achievable TP for the HSPA DL to the web browser 382. Also, at step 822, the HSPA system 816 may output the current TP for the HSPA DL to the web browser 382.

At step 824, a transmission control protocol (TCP) module 416 may determine an estimate for a TCP retransmission timeout (RTO). Additionally, at step 828, the TCP module 416 may determine a TCP receive window size. At step 830, the TCP module 416 may determine the last out of order packet 830. Moving to step 832, the TCP module 416 may output the TCP RTO estimate to the web browser 382. Further, at step 834, the TCP module 416 may output the TCP receive window size to the web browser 382.

Continuing to block 836, the web browser 382 may determine a mobile speed. The mobile speed may be determined using the following formula:

$$\text{Mobile Speed} = \sqrt{(\text{vertspeed}^2 + \text{horzspeed}^2)}$$

where,
vertspeed is the GPS vertical speed determined at step 802; and
horzspeed is the GPS horizontal speed determined at step 804.

At block 838, the web browser 382 may determine an HSPA TP headroom from the following formula:

$$\textit{HSPA TP}\text{ headroom} = \max \textit{TP} - \text{current }\textit{TP}$$

where,
max TP is the maximum achievable HSPA TP determined at step 814; and
current TP is current HSPA DL TP determined at step 818.

At block 840, the web browser 382 may compute an estimated TP headroom. For example, if the mobile speed satisfies a mobile speed condition, the TP headroom may be computed as zero. Otherwise, if the mobile speed does not satisfy the mobile speed condition, the TP headroom may be set equal to the TP HSPA headroom determined above at step 838. The mobile speed condition may be a mobile speed threshold and if the mobile speed is greater than the threshold, the mobile speed condition may be considered satisfied. For example, the threshold may be one mile per hour, two miles per hour, three miles per hour, etc. From block 840, the method 800 may proceed to block 902 of FIG. 9 and then, the method 800 may continue as described below.

Proceeding to block 842, the web browser 382 may determine a TCP window utilization size from the following formula:

$$\textit{TCP}\text{ window utilization} = \textit{HSPA DL TP} * \textit{TCP RTO} / \textit{TCP}\text{ Receive Window size}$$

where,
HSPA DL TP is the current HSPA DL TP determined at step 818;
TCP RTO is the TCP RTO estimate determined at step 824; and
TCP Receive Window Size is the TCP Receive Window Size determined at step 828.

From block 842, the method 800 may proceed to block 902 of FIG. 9 and then, the method 800 may continue as described below.

At block 902 of FIG. 9, an HTTP request may be initiated by the web browser 382. Moving to decision block 904, the web browser 382 may determine whether a TCP connection is currently open. If a TCP connection is not currently open, the method 800 may continue to block 918 and the web browser 382 may open a new TCP connection. Thereafter, the method 800 may end.

Returning to decision block 904, if the web browser 382 determines that a TCP connection is open, the method 800 may proceed to decision block 908. At decision block 908, the web browser 382 may determine whether the host is operating on HTTP version 1.1 or above. If the host is not operating on HTTP version 1.1 or above, the method 800 may proceed to block 918 described below. Thereafter, the method 800 may end.

Returning to decision block 908, if the host is operating on HTTP version 1.1 or above, the method 800 may proceed to decision block 912. At decision block 912, the web browser

382 may determine whether the TP headroom determined at block 840 satisfies a TP headroom condition. For example, the TP headroom condition may be a TP headroom threshold and the TP headroom may satisfy the TP headroom condition if the TP headroom is greater than the TP headroom threshold. In a particular aspect, the TP headroom threshold may include exemplary values, such as, but not limited to, 250 Kbps, 500 Kbps, and 1 Mbps, etc.

At decision block 912, if the TP headroom is not greater than the TP headroom threshold, the method 800 may proceed to block 910 and the web browser 382 may submit the HTTP request to the existing TCP connection. Thereafter, the method 800 may end. Returning to decision block 912, if the TP headroom is greater than the TP headroom threshold, the method 800 may proceed to decision block 914.

At decision block 914, the web browser 382 may determine whether the TCP RTO determine at step 824 satisfies a TCP RTO condition. For example, the TCP RTO condition may be a TCP RTT threshold and the TCP RTO may satisfy the TCP RTO condition if the TCP RTO is less than the TCP RTT threshold. In a particular aspect, the TCP RTT threshold values may include, but are not limited to, values of 50 ms, 200 ms, etc.

At decision block 914, if the TCP RTO is less than the TCP RTT threshold, the method 800 may proceed to block 918 and the web browser 382 may open a new TCP connection. Thereafter, the method 800 may end. Returning to decision block 914, if the TCP RTO is greater than (not less than) the TCP RTT threshold, the method 800 may proceed back to step 910 described above and the web browser 382 may submit the HTTP request to the existing TCP connection.

Figure 10:
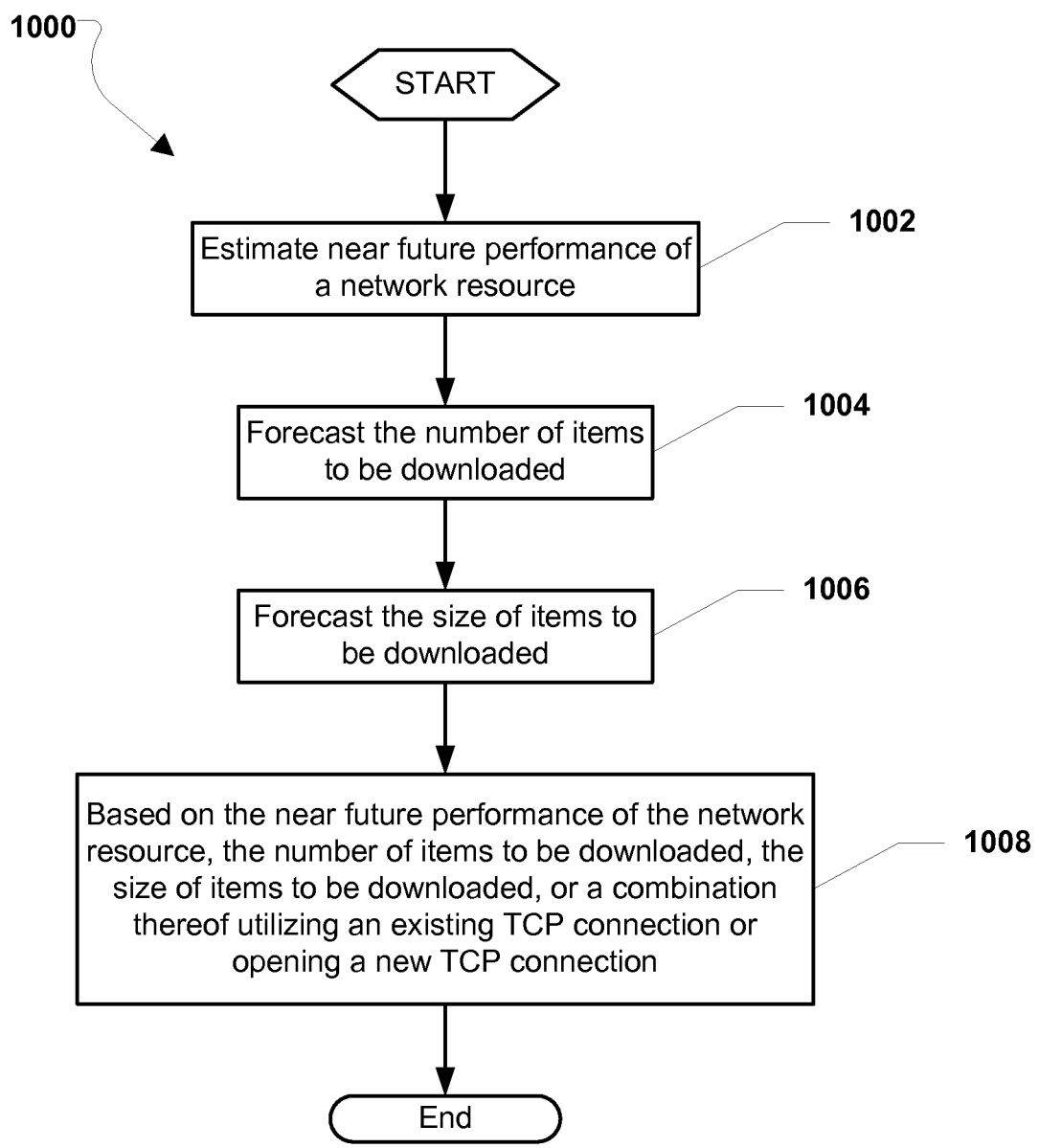
FIG. 10 is a flowchart illustrating a fourth aspect of a method of establishing transmission control protocol (TCP) connections.

Referring to FIG. 10, a fourth aspect of a method of establishing one or more transmission control protocol (TCP) connections is shown and is generally designated 1000. Beginning at block 1002, a web browser 382 may estimate a near future performance of one or more network resources. At block 1004, the web browser 382 may forecast the number of items to be downloaded. Further, at block 1006, the web browser 382 may forecast the size of items to be downloaded. At block 1008, at least partially based on the near future performance of the network resource, the number of items to be downloaded, the size of items to be downloaded, or a combination thereof, the web browser 382 may utilize an existing TCP connection or open a new TCP connection. The method 1000 may then end.

To estimate the near future performance of one or more network resources, the following factors may be considered: radio link metrics, mobility metrics, TCP metrics, or a combination thereof. The radio link metrics may include a block error rate (BLER), a signal to noise ratio (SNR), a throughput (TP) being achieved, an RTT, or a combination thereof.

It may be appreciated that the BLER may be a number incorrectly transferred data packets divided by a number of transferred packets. THE SNR may be a ratio of a signal power to a noise power that may be corrupting the signal. The throughput may be an average rate of successful message delivery over a communication channel. The throughput may be measured in bits per second (bit/s or bps). The RTT may be a time required for a signal pulse or packet to travel from a specific source to a specific destination and back again.

The mobility metrics may include whether a device is stationary, whether the device is moving, a vertical speed of the device, a horizontal speed of the device, a speed of the device, or a combination thereof. The TCP metrics may include statistics on dropped and out-of-order packets, current connection throughput, current congestion and receiver window sizes, RTO estimates, or a combination thereof.

In a particular aspect, forecasting the remaining objects to be downloaded may occur after the HTML has been parsed, the DOM tree has been created, and a determination has been made as to which required objects are not in cache. Estimating the size of the non-cached resources may be determined based on one or more HTTP metrics, a mime-type of any outstanding requests, a resource manifest file, existing expired content in a cache, or a combination thereof.

The HTTP metrics may include content-length information on outstanding requests, if the headers have already been received; HTTP version information received from the server, which may indicate if the server supports HTTP 1.1, or combination thereof. The mime-type of outstanding requests may include the expected mime-type of the new request. The expected mime-type of the new request may be inferred from the URL and filename extension. Alternatively, the expected mime-type may be provided separately by the browser by virtue of an enclosing tag, such as <img> or <script>).

A resource manifest file may include an index of the content on the page such as might be obtained in a gzip file. Caching of resource manifests, whether supported by web page or created by a client browser, may be prioritized for a resource manifest file. The existing expired content in the cache may be used to estimate the size of content, for example, if an expired script exists in the cache which was 12 kB, it is reasonable to assume the updated script would be of similar size.

Some or all of the above metrics will serve as inputs to a decision block making engine which will determine either to open a new socket, reuse an existing idle socket, pipeline the request onto an existing busy socket, or enqueue the request for later. The decision block making engine may be a web browser 382, a part of a web browser application (i.e., a plug-in) 382, a separate application, or a combination thereof.

Figure 11:
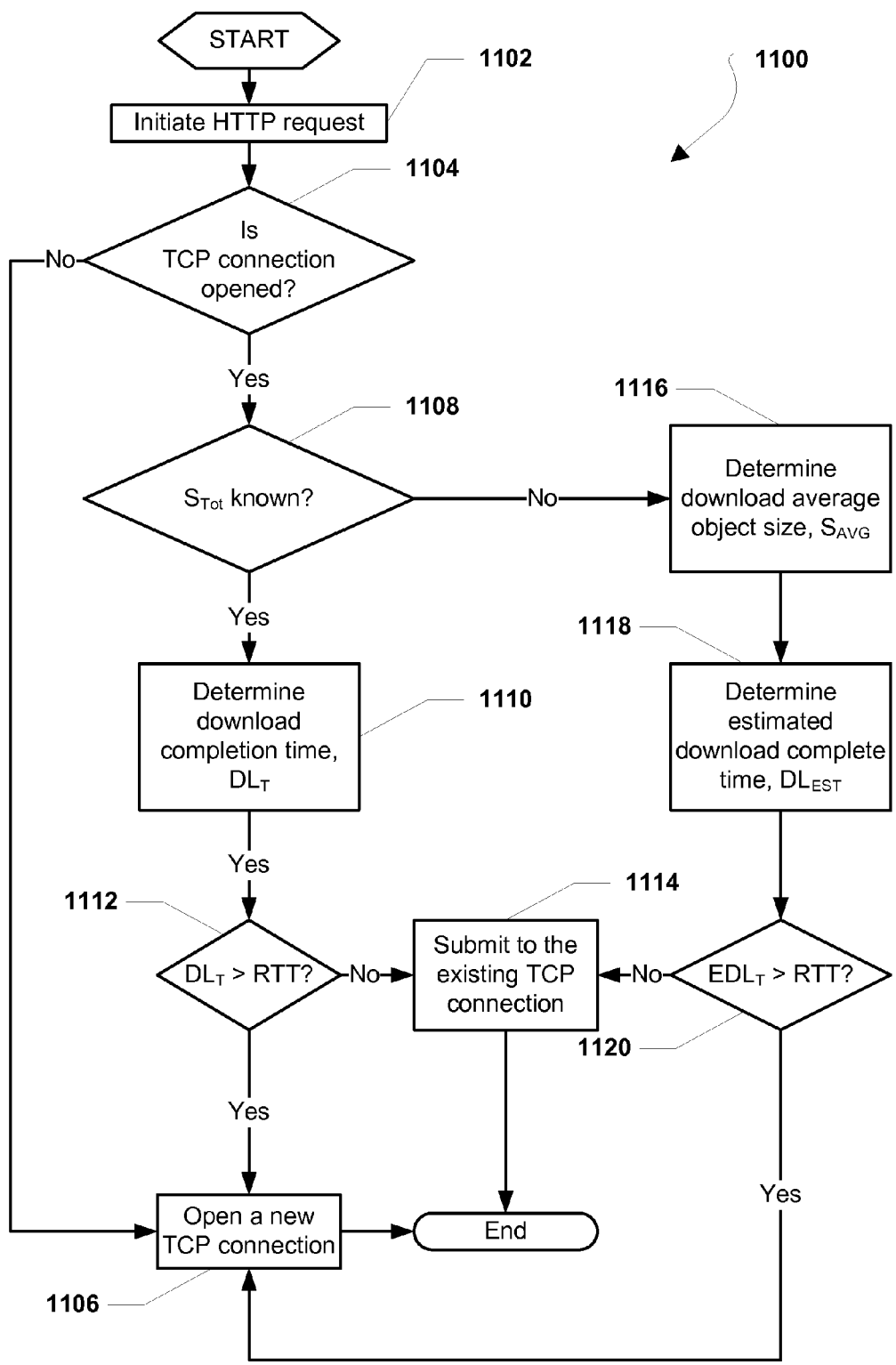
FIG. 11 is a flowchart illustrating a fifth aspect of a method of establishing TCP connections.

FIG. 11 depicts a fifth aspect of a method of establishing one or more transmission control protocol (TCP) connections, generally designated 1100. Beginning at block 1102, an HTTP request may be initiated by the web browser 382. Moving to decision block 1104, a web browser 382 may determine whether a TCP connection is currently open. If a TCP connection is not currently open, the method 1100 may continue to block 1106 and the web browser 382 may open a new TCP connection. Thereafter, the method 1100 may end.

Returning to decision block 1104, if the web browser 382 determines that a TCP connection is open, the method 1100 may proceed to decision block 1108. At decision block 1108, the web browser 382 may determine whether a total size, in bits, of a resource, or sub-resource, currently being received over the open TCP connection, or socket, is known. If so, the method 1100 may proceed to block 1110 and the web browser 382 may determine a download completion time. The download completion time may be determined using the following formula:

$$DL_T = (S_{Tot} - S_{Rx})/T$$

Where,
$DL_T$=download completion time;
$S_{TOT}$=total size of the current resource, in bits;
$S_{RX}$=number of bits already received; and
T=current downlink TCP throughput in bits per second.

From block 1110, the method 1100 may proceed to decision block 1112. At decision block 1112, the web browser 382 may determine whether the download completion time satisfies a download completion time condition. For example, the download completion time condition may be an RTT and the download completion time may satisfy the download completion time condition if the download completion time is greater than the RTT, i.e., if the expected amount of time it may take to complete the downloading of a current resource is greater than the expected amount of time need to establish a new socket connection.

At decision block 1112, if the download completion time is greater than the RTT, the method 1100 may proceed to block 1106 and the web browser 382 may open a new TCP connection. Then, the method 1100 may end.

Returning to decision block 1112, if the download completion time is not greater than the RTT, the method 1100 may proceed to block 1114 and the web browser 382 may submit the HTTP request to the existing TCP connection. Thereafter, the method 1100 may end.

Returning to decision block 1108, if the $S_{Tot}$ is not known, the method 1100 may proceed to block 1116. At block 1116, the web browser may determine an average object size, $S_{AVG}$. The $S_{AVG}$ may be an average size of the resource object based on the mime type of the outstanding request. The $S_{AVG}$ may be determined dynamically on a per-host basis, based on either the sizes of objects already received from the current host, historical information, or a combination thereof. In another aspect, the $S_{AVG}$ may be determine based on a pre-determined constant computed by averaging the size of similar resources received from a plurality of other web sites.

From block 1116, the method 1100 may proceed to block 1118 and the web browser 382 may determine an estimated download complete time, $DL_{EST}$. The estimated download complete time may be determined from the following formula:

$$DL_{EST}=(S_{AVG}-S_{RX})/T$$

Where,
$DL_{EST}$=estimated download completion time;
$S_{AVG}$=average object size, in bits;
$S_{RX}$=number of bits already received; and
T=current downlink TCP throughput in bits per second.

From block 1118, the method 1100 may proceed to decision block 1120. At decision block 1120, the web browser 382 may determine whether the estimated download completion time satisfies an estimate download completion time condition. For example, the estimated download completion time condition may be an RTT and the estimated download completion time may satisfy the condition if the estimated download completion time is greater than the RTT. At decision block 1120, if the estimated download completion time is greater than the RTT, the method 1100 may proceed to block 1106 and the web browser 382 may open a new TCP connection. Then, the method 1100 may end.

Returning to decision block 1112, if the estimated download completion time is not greater than the RTT, the method 1100 may proceed to block 1114 and the web browser 382 may submit the HTTP request to the existing TCP connection. Thereafter, the method 1100 may end.

Figure 12:
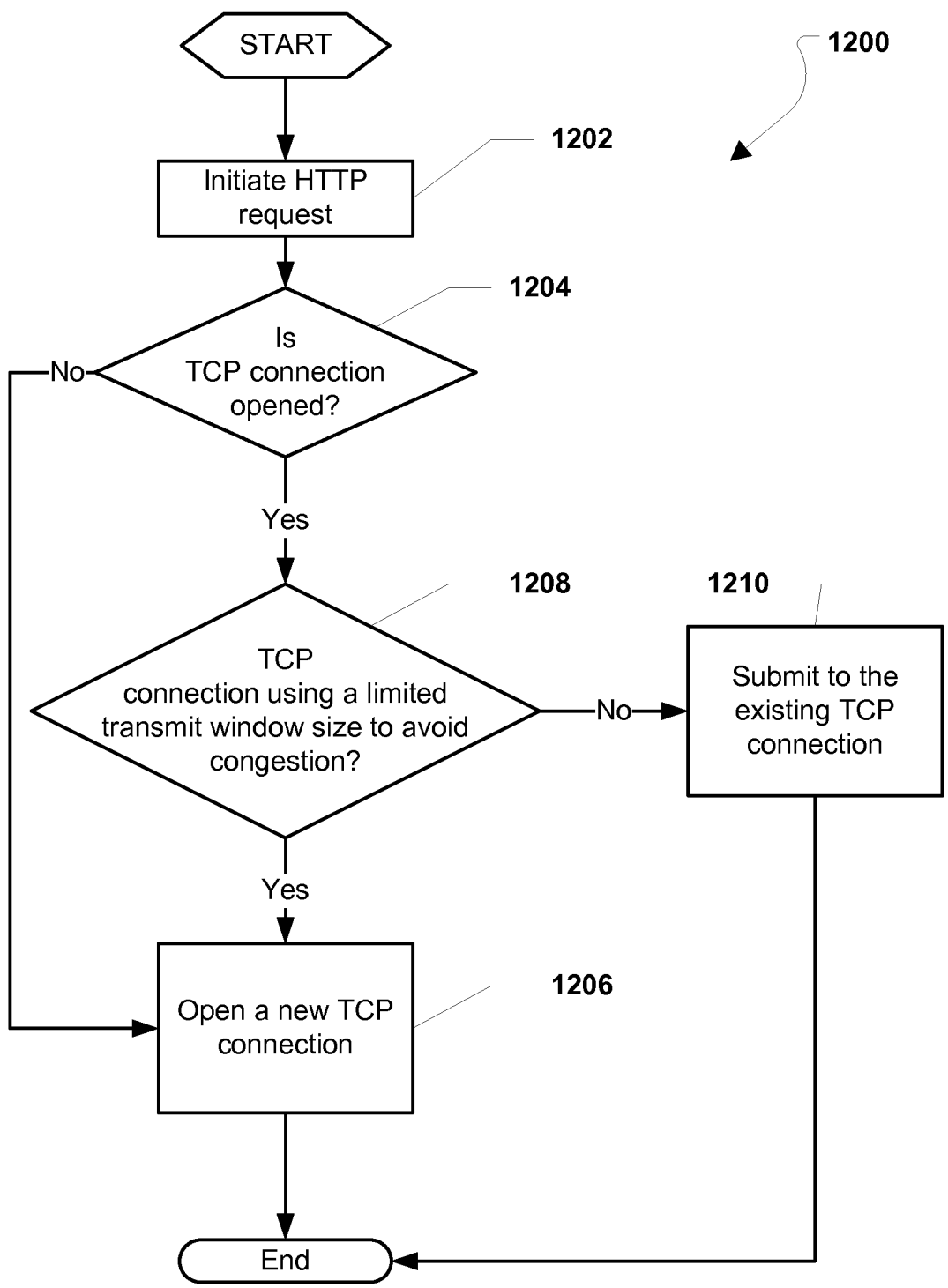
FIG. 12 is a flowchart illustrating a sixth aspect of a method of establishing TCP connections.

FIG. 12 depicts a sixth aspect of a method of establishing one or more transmission control protocol (TCP) connections is shown and is generally designated 1200. Commencing at block 1202, an HTTP request may be initiated by the web browser 382. Moving to decision block 1204, a web browser 382 may determine whether a TCP connection is currently open. If a TCP connection is not currently open, the method 1200 may continue to block 1206 and the web browser 382 may open a new TCP connection. Thereafter, the method 1200 may end.

Returning to decision block 1204, if the web browser 382 determines that a TCP connection is open, the method 1200 may proceed to decision block 1208. At decision block 1208, the web browser 382 may determine whether the TCP connection is using a limited transmit window size to avoid congestion.

If the TCP connection is not using a limited transmit window size in order to avoid congestion, the method 1200 may proceed to block 1210. At block 1210, the web browser 382 may submit the HTTP request to the existing TCP connection. Thereafter, the method 1200 may end.

Returning to decision block 1208, if the TCP connection is using a limited transmit window size to avoid congestion, the method 1200 may proceed to block 1206. At block 1206, the window browser application may open a new TCP connection. Thereafter, the method 1200 may end.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof. Also, the various method steps may be combined in any order in order to create new methods.

With the configuration described herein, the systems and methods herein may be used to substantially speed up DNS lookups. Further, the systems and methods herein may be used for efficient establishment of new TCP connections, the re-use of TCP connections, or a combination thereof.

In one aspect, a device, e.g., a web browser 382 stored on the device, may maintain a database in memory 344, indexed by URL, of all the hosts from which sub-resources were loaded for a particular URL the last time that the content associated with the URL was loaded on the device as illustrated in FIG. 5. When the user navigates to a particular URL, the database 403 may be consulted, and if an entry is found, then a DNS lookup and TCP connection establishment is performed for each host listed in the database entry, in parallel with the main resource load. Further, after the page is fully loaded, the database 403 may be updated with the actual set of hosts contacted for the latest load. The browser may choose to delete any hosts not contacted in the latest load, or to merge the old list with the new list.

This approach may be useful on edges of cellular coverage zones. In such areas, the uplink performance may erode to a barely usable state, e.g. 4 kbps, even though the download performance may still be adequate, e.g., 300 kbps. The current and conventional approach of DNS lookup followed by HTTP GET command in conventional computing devices equates to the uplink accesses being delayed by at least the time to return the HTTP object and only after the main resource is loaded. Although the proposed approach may perform some DNS lookups that ultimately may not be required, starting DNS lookups before the main resource is loaded and the queuing of the DNS lookups rather than spacing them by the subsequent HTTP GET command tasks results in better uplink performance.

In one or more exemplary aspects, the functions described may be implemented in hardware, software, firmware, or any combination thereof. If implemented in software, the functions may be stored on or transmitted over as one or more instructions or code on a computer program product such as a machine readable medium, i.e., a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of establishing transmission control protocol ("TCP") connections for a portable computing device ("PCD"), the method comprising:
   receiving at a web browser of the PCD a uniform resource locator ("URL") as part of a hypertext transfer protocol ("HTTP") request for a web page;
   searching a host database with the received URL, wherein the host database is maintained within a memory resource of the PCD and contains host data comprised of a list of servers that contain main resources and/or sub-resources previously provided to the PCD, the list of servers indicating main resource hosts and/or sub-resource hosts indexed in the host database by their associated URLs;
   determining that host data for the received URL is available;
   performing a domain name service ("DNS") lookup for a main resource host associated with the received URL and for one or more sub-resource hosts recorded in the host data for the URL, wherein all DNS lookups are performed in parallel at substantially the same time before a main resource is loaded;
   determining whether a TCP connection is open;
   determining whether a host is operating on an HTTP version 1.1 or greater when the connection is open;
   determining if an estimated throughput ("TP") headroom exceeds a TP headroom threshold; and
   submitting the HTTP request to the open TCP connection when the estimated TP headroom does not exceed the TP headroom threshold.

2. The method of claim 1, further comprising:
   establishing at least one TCP connection for the main resource host and for each of the one or more sub-resource hosts.

3. The method of claim 2, further comprising:
   loading a main resource; and
   loading one or more sub-resources.

4. The method of claim 3, further comprising:
   updating the host database, when the web page for the URL is fully loaded.

5. The method of claim 3, wherein the method further comprises forecasting remaining objects to be downloaded after an HTML file has been parsed.

6. The method of claim 1, further comprising:
   determining whether a TCP retransmission timeout (RTO) satisfies a TCP RTO condition; and
   submitting the HTTP request to an existing TCP connection when the TCP RTO does not satisfy the TCP RTO condition.

7. The method of claim 6, further comprising:
   opening a new TCP connection when the TCP RTO satisfies the TCP RTO condition; and
   determining whether a TCP window utilization satisfies a TCP window utilization condition when the TCP RTO does not satisfy the TCP RTO condition.

8. The method of claim 7, further comprising:
   opening a new TCP connection when the TCP window utilization satisfies the TCP window utilization condition; and
   submitting the HTTP request to an existing TCP connection when the TCP window utilization does not satisfy the TCP window utilization condition.

9. A portable computing device ("PCD"), the PCD comprising:
   means for receiving at a web browser of the PCD a uniform resource locator ("URL") as part of a hypertext transfer protocol ("HTTP") request for a web page;
   means for searching a host database with the received URL, wherein the host database is maintained within a memory resource of the PCD and contains host data comprised of a list of servers that contain main resources and/or sub-resources previously provided to the PCD, the list of servers indicating main resource hosts and/or sub-resource hosts indexed in the host database by their associated URLs;
   means for determining that host data for the received URL is available;
   means for performing a domain name service ("DNS") lookup for a main resource host associated with the received URL and for one or more sub-resource hosts recorded in the host data for the URL, wherein all DNS lookups are performed in parallel at substantially the same time before a main resource is loaded;
   means for determining whether a TCP connection is open;
   means for determining whether a host is operating on an HTTP version 1.1 or greater when the connection is open;
   means for determining if an estimated throughput ("TP") headroom exceeds a TP headroom threshold; and
   means for submitting the HTTP request to the open TCP connection when the estimated TP headroom does not exceed the TP headroom threshold.

10. The device of claim 9, further comprising:
    means for establishing at least one connection for the main resource host and for each of the one or more sub-resource hosts.

11. The device of claim 10, further comprising:
    means for loading a main resource; and
    means for loading one or more sub-resources.

12. The device of claim 11, further comprising means for forecasting remaining objects to be downloaded after an HTML file has been parsed.

13. The device of claim 9, further comprising:
    means for updating the host database, when the web page for the URL is fully loaded.

14. The device of claim 9, further comprising:
means for determining whether a TCP retransmission timeout (RTO) satisfies a TCP RTO condition; and
means for submitting the HTTP request to an existing TCP connection when the TCP RTO does not satisfy the TCP RTO condition.

15. The device of claim 14, further comprising:
means for opening a new TCP connection when the TCP RTO satisfies the TCP RTO condition; and
means for determining whether a TCP window utilization satisfies a TCP window utilization condition when the TCP RTO does not satisfy the TCP RTO condition.

16. The device of claim 15, further comprising:
means for opening a new TCP connection when the TCP window utilization satisfies the TCP window utilization condition; and
means for submitting the HTTP request to an existing TCP connection when the TCP window utilization does not satisfy the TCP window utilization condition.

17. A portable computing device ("PCD") comprising:
a memory resource; and
a processor in communication with the memory, wherein the processor is operable to:
receive via a web browser of the PCD a uniform resource locator ("URL") as part of a hypertext transfer protocol ("HTTP") request for a web page;
search a host database with the received URL, wherein the host database is maintained within the memory resource of the PCD and contains host data comprised of a list of servers that contain main resources and/or sub-resources previously provided to the PCD, the list of servers indicating main resource hosts and/or sub-resource hosts indexed in the host database by their associated URLs;
determine that host data for the received URL is available;
perform a domain name service ("DNS") lookup for a main resource host associated with the received URL and for one or more sub-resource hosts recorded in the host data for the URL, wherein all DNS lookups are performed in parallel at substantially the same time before a main resource is loaded;
determine whether a TCP connection is open;
determine whether a host is operating on an HTTP version 1.1 or greater when the connection is open;
determine if an estimated throughput ("TP") headroom exceeds a TP headroom threshold; and
submit the HTTP request to the open TCP connection when the estimated TP headroom does not exceed the TP headroom threshold.

18. The device of claim 17, wherein the processor is further operable to:
establish a TCP connection for the main resource host and for each of the one or more sub-resource hosts.

19. The device of claim 18, wherein the processor is further operable to:
load a main resource; and load one or more sub-resources.

20. The device of claim 19, wherein the processor is further operable to: forecast remaining objects to be downloaded after an HTML file has been parsed.

21. The device of claim 19, wherein the processor is further operable to:
update the host database, when the web page for the URL is fully loaded.

22. The device of claim 17, wherein the processor is further operable to:
determine whether a TCP retransmission timeout (RTO) satisfies a TCP RTO condition; and
submit the HTTP request to an existing TCP connection when the TCP RTO does not satisfy the TCP RTO condition.

23. The device of claim 22, wherein the processor is further operable to:
open a new TCP connection when the TCP RTO satisfies the TCP RTO condition; and
determine whether a TCP window utilization satisfies a TCP window utilization condition when the TCP RTO does not satisfy the TCP RTO condition.

24. The device of claim 23, wherein the processor is further operable to:
open a new TCP connection when the TCP window utilization satisfies the TCP window utilization condition; and
submit the HTTP request to an existing TCP connection when the TCP window utilization does not satisfy the TCP window utilization condition.

25. A computer program product comprising a computer usable device having a non-transitory computer readable program code embodied therein, said non-transitory computer readable program code adapted to be executed for establishing transmission control protocol ("TCP") connections for a wireless portable computing device ("PCD"), the computer program product comprising:
at least one instruction for receiving at a web browser of the PCD a uniform resource locator ("URL") as part of a hypertext transfer protocol ("HTTP") request for a web page;
at least one instruction for searching a host database with the received URL, wherein the host database is maintained within a memory resource of the PCD and contains host data comprised of a list of servers that contain main resources and/or sub-resources previously provided to the PCD, the list of servers indicating main resource hosts and/or sub-resource hosts indexed in the host database by their associated URLs;
at least one instruction for determining that host data for the received URL is available;
at least one instruction for performing a domain name service ("DNS") lookup for a main resource host associated with the received URL and for one or more sub-resource hosts recorded in the host data for the URL, wherein all DNS lookups are performed in parallel at substantially the same time before a main resource is loaded;
at least one instruction for determining whether a TCP connection is open;
at least one instruction for determining whether a host is operating on an HTTP version 1.1 or greater when the connection is open;
at least one instruction for determining if an estimated throughput ("TP") headroom exceeds a TP headroom threshold; and
at least one instruction for submitting the HTTP request to the open TCP connection when the estimated TP headroom does not exceeds the TP headroom threshold.

26. The computer program product of claim 25, further comprising:
at least one instruction for establishing at least one connection for the main resource host and for each of the one or more sub-resource hosts.

27. The computer program product of claim 26, further comprising:
- at least one instruction for loading a main resource; and
- at least one instruction for loading one or more sub-resources.

28. The computer program product of claim 27, further comprising:
- at least one instruction for updating the host database, when the web page for the URL is fully loaded.

29. The computer program product of claim 25, further comprising:
- at least one instruction for determining whether a TCP retransmission timeout (RTO) satisfies a TCP RTO condition; and
- at least one instruction for submitting the HTTP request to an existing TCP connection when the TCP RTO does not satisfy the TCP RTO condition.

30. The computer program product of claim 29, further comprising:
- at least one instruction for opening a new TCP connection when the TCP RTO satisfies the TCP RTO condition; and
- at least one instruction for determining whether a TCP window utilization satisfies a TCP window utilization condition when the TCP RTO does not satisfy the TCP RTO condition.

31. The computer program product of claim 30, further comprising:
- at least one instruction for opening a new TCP connection when the TCP window utilization satisfies the TCP window utilization condition; and
- at least one instruction for submitting the HTTP request to an existing TCP connection when the TCP window utilization does not satisfy the TCP window utilization condition.

* * * * *